United States Patent
Masui (10) Patent No.: US 9,502,727 B2
(45) Date of Patent: Nov. 22, 2016

(54) FUEL CELL SYSTEM AND METHOD OF CONTROLLING A FUEL CELL SYSTEM

(75) Inventor: Takatoshi Masui, Mishima (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 501 days.

(21) Appl. No.: 12/994,054

(22) PCT Filed: Jul. 22, 2009

(86) PCT No.: PCT/JP2009/003449
§ 371 (c)(1),
(2), (4) Date: Nov. 22, 2010

(87) PCT Pub. No.: WO2010/010699
PCT Pub. Date: Jan. 28, 2010

(65) Prior Publication Data
US 2011/0076579 A1  Mar. 31, 2011

(30) Foreign Application Priority Data
Jul. 25, 2008  (JP) ................................. 2008-192310

(51) Int. Cl.
*H01M 8/0444* (2016.01)
*H01M 8/0612* (2016.01)
(Continued)

(52) U.S. Cl.
CPC ............ *H01M 8/0612* (2013.01); *C01B 3/384* (2013.01); *H01M 8/0444* (2013.01);
(Continued)

(58) Field of Classification Search
CPC .................................. H01M 8/04; H01M 8/06
(Continued)

(56) References Cited

U.S. PATENT DOCUMENTS

| | | | | |
|---|---|---|---|---|
| 6,165,633 A | * | 12/2000 | Negishi | 429/424 |
| 6,277,508 B1 | * | 8/2001 | Reiser et al. | 429/412 |
| 6,433,696 B1 | * | 8/2002 | Deiterman et al. | 340/632 |
| 2007/0154750 A1 | * | 7/2007 | Ukai et al. | 429/19 |
| 2008/0081232 A1 | * | 4/2008 | Kuwata et al. | 429/19 |
| 2009/0092883 A1 | * | 4/2009 | Ozeki et al. | 429/34 |

FOREIGN PATENT DOCUMENTS

| JP | H07-296834 | * 11/1995 | H01M 8/04 |
|---|---|---|---|
| JP | 2000-034101 A | 2/2000 | |

(Continued)

OTHER PUBLICATIONS

Irie et al. JP H07-296834. Nov. 10, 1995. English machine translation by JPO.*

*Primary Examiner* — James Lee
(74) *Attorney, Agent, or Firm* — Andrews Kurth Kenyon LLP (57) ABSTRACT

In a fuel cell system that includes a reformer adapted to reform a feedstock, and a fuel cell that uses fuel gas contained in the reformed gas produced by this reformer to generate electricity, aims to improve generation efficiency in the fuel cell through a relatively simple feature. The fuel cell system includes a feedstock supplying section such as a pressurizing pump for supplying the feedstock to the reformer; a burner adapted to combust the fuel gas that was not consumed by electricity generation in the fuel cell, and heat the reformer; a temperature sensor for sensing the temperature of the burner; and a control unit adapted to control on the basis of the sensed temperature the feed rate of the feedstock supplied from the feedstock supplying section to the reformer, so as to maintain the temperature of the reformer within a prescribed temperature range optimized for reforming the feedstock.

1 Claim, 7 Drawing Sheets

(51) Int. Cl.
*H01M 8/06* (2016.01)
*C01B 3/38* (2006.01)
*H01M 8/04* (2016.01)

(52) U.S. Cl.
CPC ..... *H01M 8/04373* (2013.01); *H01M 8/04776* (2013.01); *C01B 2203/0205* (2013.01); *C01B 2203/066* (2013.01); *C01B 2203/0822* (2013.01); *C01B 2203/0827* (2013.01); *C01B 2203/169* (2013.01); *C01B 2203/1619* (2013.01); *Y02E 60/50* (2013.01); *Y02P 20/128* (2015.11)

(58) Field of Classification Search
USPC .................................................. 429/400–535
See application file for complete search history.

(56) References Cited

FOREIGN PATENT DOCUMENTS

| | | |
|---|---|---|
| JP | 2002083620 A | 3/2002 |
| JP | 2003-68343 A | 3/2003 |
| JP | 2004-060910 A | 2/2004 |
| JP | 2005-026059 A | 1/2005 |
| JP | 2005-108651 A | 4/2005 |
| JP | 2005-285593 A | 10/2005 |
| JP | 2005285593 A | 10/2005 |
| JP | 2006-331990 A | 12/2006 |
| JP | 2008-171707 A | 7/2008 |
| JP | 2008171707 A | 7/2008 |

\* cited by examiner

FUEL CELL SYSTEM AND METHOD OF CONTROLLING A FUEL CELL SYSTEM

This is a 371 national phase application of PCT/JP2009/0034449 filed 22 Jul. 2009, which claims priority of Japanese Patent Application No. 2008-192310 filed 25 Jul. 2008, the contents of which are incorporated herein by reference.

TECHNICAL FIELD

The present invention relates to a fuel cell system and to a method of controlling a fuel cell system.

BACKGROUND ART

Fuel cells, which generate electricity through an electrochemical reaction of a fuel gas and an oxidant gas, are a notable energy source. A so-called reforming type fuel cell system is one type of fuel cell system furnished with such a fuel cell. A reforming type fuel cell system (herein termed simply "a fuel cell system") is a fuel cell system of a type in which a feedstock (such as an alcohol, hydrocarbon, aldehyde, or the like) is reformed by a reformer to generate a reformed gas, and the fuel gas (hydrogen) contained in this reformed gas is utilized by the fuel cell to generate electricity.

In such fuel cell systems, a steam reforming reaction, which affords excellent hydrogen yield, is often employed to reform the fuel in the reformer. Also, the steam reforming reaction is an endothermic reaction. Thus, in order to maintain the proper reaction temperature, the reformer is typically heated by a burner. Moreover, in such fuel cell systems, it is common practice for fuel gas not consumed by electricity generation in the fuel cell to be combusted in the burner, for the purpose of efficiently utilizing the fuel gas generated by the reformer.

In the fuel cell systems described above, generating a prescribed quantity of fuel gas requires controlling the feed rate of feedstock and or steam to the reformer, as well as controlling the temperature of the reformer, i.e. combustion in the combustion section. The reason is that reforming efficiency (the conversion rate in the reforming reaction) is closely related to the temperature of the reformer. Accordingly, for conventional fuel cell systems, a number of techniques have been proposed for controlling combustion in the combustion section on the basis of various sensor readings, in order to maintain appropriate reforming efficiency levels and improve generation efficiency in the fuel cells.

Patent Citation 1: JP-A 2000-34101
Patent Citation 2: JP-A 2004-60910
Patent Citation 3: JP-A 2005-26059
Patent Citation 4: JP-A 2006-331990

DISCLOSURE OF THE INVENTION

Problem the Invention Attempts to Solve

However, with the techniques disclosed in the above patent citations, the particulars of the control process are complicated; and because the values of the various parameters employed in the control process may fluctuate in relation to one another for various reasons, there was a risk of diminished convergence of control. Additionally, monitoring the values of the various parameters employed for control requires providing sensors of various kinds, which led to increased cost of the fuel cell system.

The object of the present invention is to solve the problem discussed above and thus to provide a technique to improve generation efficiency in a fuel cell through a relatively simple feature, in a fuel cell system that includes a reformer for reforming a feedstock and a fuel cell for generating electricity using fuel gas contained in the reformed gas produced by the reformer.

The disclosure of Patent Application 2008-192310 filed with the Japanese Patent Office by Toyota Motor Corporation is incorporated herein by reference.

Means for Solving the Problem

The present invention is addressed to attaining the above objects at least in part according to the following aspects of the invention.

First Aspect

A fuel cell system comprising:

a reformer which reforms a feedstock to produce a reformed gas;

a feedstock supplying section which supplies the feedstock to the reformer;

a fuel cell which generates electricity using a fuel gas contained in the reformed gas;

a burner section which combusts the fuel gas that was not consumed in electricity generation in the fuel cell to heat the reformer;

a temperature sensing portion which senses a temperature of the reformer or a temperature of the burner section; and a control portion which controls based on the sensed temperature a feed rate of the feedstock supplied from the feedstock supplying section to the reformer, so as to maintain the temperature of the reformer within a prescribed temperature range appropriate for reforming the feedstock.

According to the fuel cell system of the first aspect, control of the feed rate of feedstock supplied from the feedstock supplying section to the reformer is carried out on the basis of the temperature of the reformer or the temperature of the burner section. Thus, no complicated control scheme is needed, and convergence of control can be improved through a relatively simple feature. Moreover, because the temperature of the reformer is maintained within a prescribed temperature range appropriate for reforming the feedstock, and a prescribed quantity of fuel gas is generated by the reformer, generation efficiency in the fuel cell may be improved. That is, according to the fuel cell system of the first aspect, generation efficiency in the fuel cell may be improved.

The prescribed temperature range appropriate for reforming feedstock may vary according to the type of feedstock. Herein, temperature appropriate for reforming feedstock refers to temperature at which reforming of feedstock proceeds relatively efficiently, or temperature at which the reforming efficiency of the feedstock is relatively high.

According to the present aspect, any of various modes may be adopted for determining the feed rate of feedstock to be supplied to the reformer. For example, in one optional mode, the feed rate of feedstock to be supplied to the reformer is calculated as follows. Specifically, the amount of fuel gas to be produced by the reformer is calculated by multiplying a correction factor that is dependent on reformer temperature or burner section temperature, by the sum of the amount of fuel gas needed for electricity generation in the fuel cell and the amount of fuel gas needed for combustion in the burner section. The feed rate of feedstock to be supplied to the reformer is then calculated by dividing the calculated amount of fuel gas by the reforming efficiency in the reformer.

Optionally, the feed rate of feedstock to be supplied to the reformer may be calculated as follows. Specifically, the amount of fuel gas to be produced by the reformer is calculated as the sum of the amount of fuel gas needed for electricity generation by the fuel cell, and the amount of fuel gas needed for combustion in the burner section, corrected according to the temperature of the reformer or the temperature of the burner section. The feed rate of feedstock to be supplied to the reformer is then calculated by dividing the calculated amount of fuel gas by the reforming efficiency in the reformer.

Optionally, the feed rate of feedstock to be supplied to the reformer may be calculated as follows. Specifically, the amount of fuel gas to be produced by the reformer is calculated as the sum of the amount of fuel gas needed for electricity generation by the fuel cell, the amount of fuel gas needed for combustion in the burner section, and a correction quantity dependent on the temperature of the reformer or the temperature of the burner section. The feed rate of feedstock to be supplied to the reformer is then calculated by dividing the calculated amount of fuel gas by the reforming efficiency in the reformer.

Second Aspect

The fuel cell system according to the first aspect wherein the temperature sensing portion determines at least one of the temperature of the reformer and the temperature of the burner section based on a concentration or amount of a prescribed gas contained in effluent gases discharged from the burner section.

The concentration or amount of certain prescribed gas contained in effluent gases discharged from the burner section varies with the temperature of the burner section. Accordingly, it is possible to know the relationship between the concentration or amount of a prescribed gas contained in effluent gases, and the temperature of the burner section. Thus, once the concentration or amount of the prescribed gas is detected, it is possible to estimate the temperature of the burner section on the basis of these values. Examples of such prescribed gases are oxygen, carbon monoxide, and nitrogen oxides (NOx).

Third Aspect

The fuel cell system according to the second aspect wherein the prescribed gas is carbon monoxide, and the temperature sensing portion includes a carbon monoxide sensor which senses the concentration of carbon monoxide contained in the effluent gases.

From an environmental pollution standpoint, it is desirable to monitor carbon monoxide emissions from the fuel cell system. According to the fuel cell system of the third aspect, the temperature of the burner section can be estimated without the use of a temperature sensor for sensing the temperature of the burner section, while monitoring carbon monoxide emissions from the fuel cell system.

In addition to the fuel cell system embodiment described above, the present invention may be embodied as a method invention for controlling a fuel cell system. Various other possible embodiments of the invention include a computer program for realization of the preceding elements; a recording medium having this computer program recorded thereon; or a data signal containing the program and carried on a carrier wave. The various supplemental elements mentioned previous may be implemented in these respective embodiments as well.

Where the present invention is embodied as a computer program or a recording medium having the program recorded thereon, it may constitute the entirety of the program for controlling operation of the fuel cell system, or only that portion used to carry out the functions of the present invention. Various computer-readable media may be employed as the recording medium, such as a flexible disk, CD-ROM, DVD-ROM, magneto-optical disk, IC card, ROM cartridge, punch card, printed matter imprinted with symbols such as a bar code, computer internal memory devices (memory such as RAM and ROM), and external memory devices.

These and other objects, features, and advantages of the invention will be apparent from the following detailed description of the preferred embodiments of the invention with reference to the accompanying drawings.

BEST MODE FOR CARRYING OUT THE INVENTION

The modes of working the present invention are described below based on the preferred embodiments.

Figure 1:
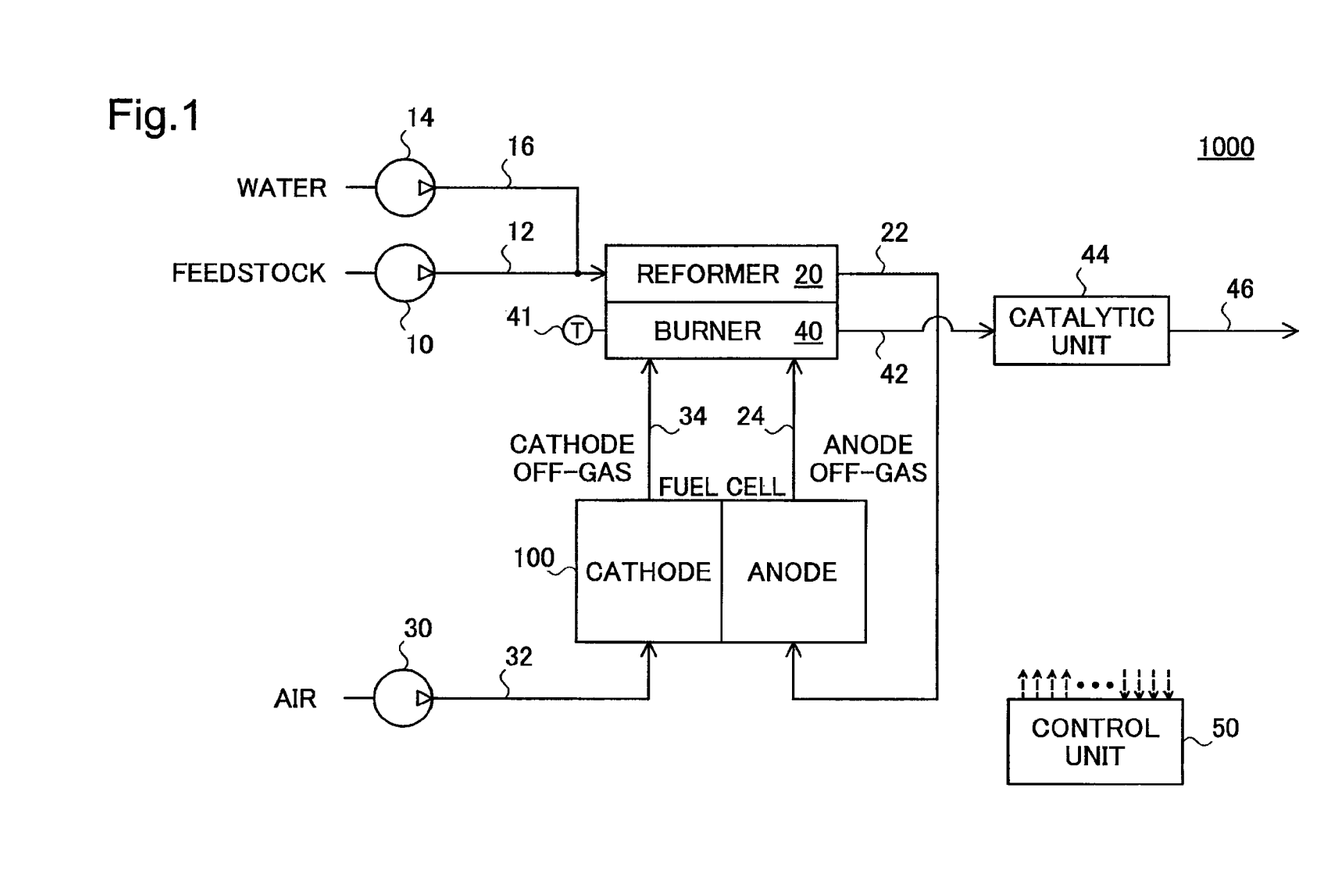
FIG. 1 depicts the general features of a fuel cell system 1000 according to a first embodiment of the invention.

A. First Embodiment:

A1. Fuel Cell System:

FIG. 1 depicts the general features of a fuel cell system 1000 according to a first embodiment of the invention. This particular fuel cell system 1000 is a so-called reforming type fuel cell system. The fuel cell system 1000 includes a reformer 20 for reforming a feedstock, and a fuel cell 100 that generates electricity utilizing a fuel gas (hydrogen) contained in the reformed gas produced by the reformer 20. The reformer 20 carries out reforming of the feedstock through a steam reforming reaction, which is an endothermic reaction. Accordingly, the fuel cell system 1000 is also provided with a burner 40 for heating the reformer 20. In the present embodiment, a solid oxide type fuel cell is employed as the fuel cell 100. In this instance, besides hydrogen, unreacted fuel such as hydrocarbons (unreacted feedstock) present in the reformed gas, or carbon monoxide produced by the reforming reaction, are also used for generation in the fuel cell 100. A fuel cell of another type, such as a solid polymer, phosphoric acid fuel cell, or molten carbonate fuel cell could also be used for the fuel cell 100.

In this fuel cell system 1000, a feedstock stored in a feedstock tank, not shown, is pressurized by a pressurizing pump 10 and delivered to the reformer 20 through a line 12. As the feedstock, hydrocarbon compounds such as gasoline, alcohols (e.g. methanol), ethers, aldehydes or the like may be used. The feed rate of feedstock to the reformer 20 may be controlled, for example, by varying the speed of the motor provided to the pressurizing pump 10, or the aperture of a flow regulator valve, not shown, installed in the line 12. Elements such as the feedstock tank, the pressurizing pump 10, and the flow regulator valve correspond to the feedstock supplying section recited in the Summary section. Using a reforming water pump 14, the reformer 20 is supplied through a line 16 with the water used in the steam reforming reaction. The feed rate of water to the reformer 20 is controlled by varying the speed of the motor provided to the reforming water pump 14.

The reformer 20 reforms the feedstock through a steam reforming reaction to produce a mixed gas (reformed gas) containing hydrogen as a fuel gas. The hydrogen-containing mixed gas produced by the reformer 20 is delivered through a line 22 to the anode of the fuel cell 100. The anode off-gas discharged from the anode of the fuel cell 100 is then delivered to the burner 40 through a line 24. The anode off-gas contains hydrogen not consumed during generation in the fuel cell 100, unreformed feedstock, and carbon monoxide.

The cathode of the fuel cell 100 is supplied through a line 32 with air compressed by an air compressor 30, by way of an oxidant gas containing oxygen. The feed rate of air to the fuel cell 100 is controlled, for example, by varying the speed of the motor provided to the air compressor 30. The cathode off-gas discharged from the cathode of the fuel cell 100 is then delivered to the burner 40 through a line 34. The cathode off-gas contains oxygen not consumed during generation in the fuel cell 100. This oxygen is utilized in the burner 40 as a combustion aid gas for combusting the hydrogen, unreformed feedstock, and carbon monoxide.

The burner 40 combusts the hydrogen not consumed during generation in the fuel cell 100, the unreformed feedstock, and the carbon monoxide contained in the anode off-gas, and heats the reformer 20. Herein, the term "combustion" refers to the phenomenon or process of reacting a substance with oxygen to produce heat. "Combustion" is used herein to include both oxidation reactions employing a catalyst, and oxidation reactions not employing a catalyst.

The burner 40 is equipped with a temperature sensor 41 for sensing the temperature of the burner 40. The effluent gases discharged from the burner 40 are delivered to a catalytic unit 44 through a line 42. In this catalytic unit 44, the unreformed feedstock and carbon monoxide not completely combusted in the burner 40, as well as nitrogen oxides produced in the burner 40, are removed from the effluent gases discharged from the burner 40, then vented to the outside through a line 46. The steam contained in the effluent gases is recovered by a heat exchanger, not shown, and recycled for use in reforming the feedstock in the reformer 20 for example.

Operation of the fuel cell system 100 is controlled by a control unit 50. The control unit features a microcomputer having internal components such as a CPU, RAM, ROM, and a timer, and is adapted to control operation of the system, such as actuation of the various different valves and pumps for example, according to a program stored in the ROM.

Figure 2:
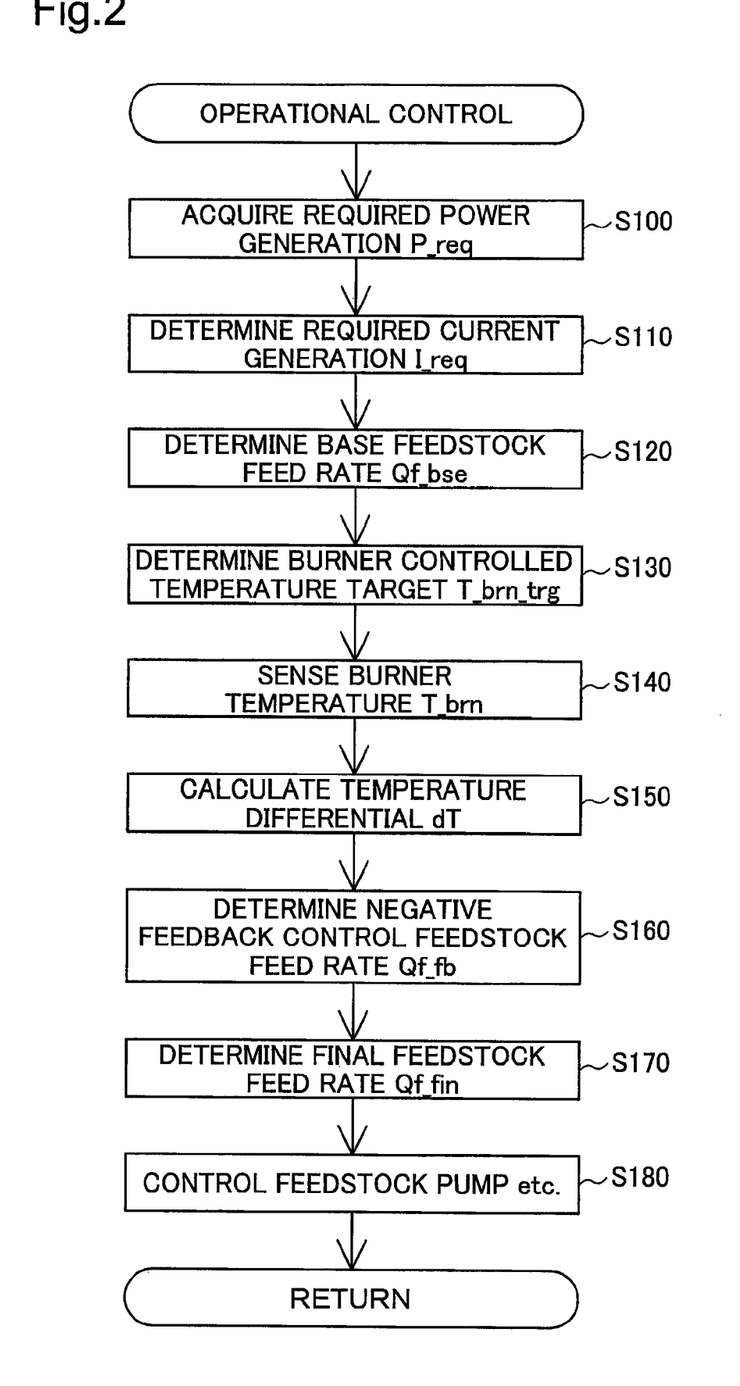
FIG. 2 is a flowchart showing the flow of operational control in the fuel cell system 1000 according to the first embodiment.

A2. Operational Control:

FIG. 2 is a flowchart showing the flow of operational control in the fuel cell system 1000 according to the first embodiment. This control process is one that the control unit 50 executes repeatedly at prescribed intervals during electricity generation by the fuel cell 100. In the present embodiment, the control unit 50 executes the process at 1024-ms intervals.

Figure 3:
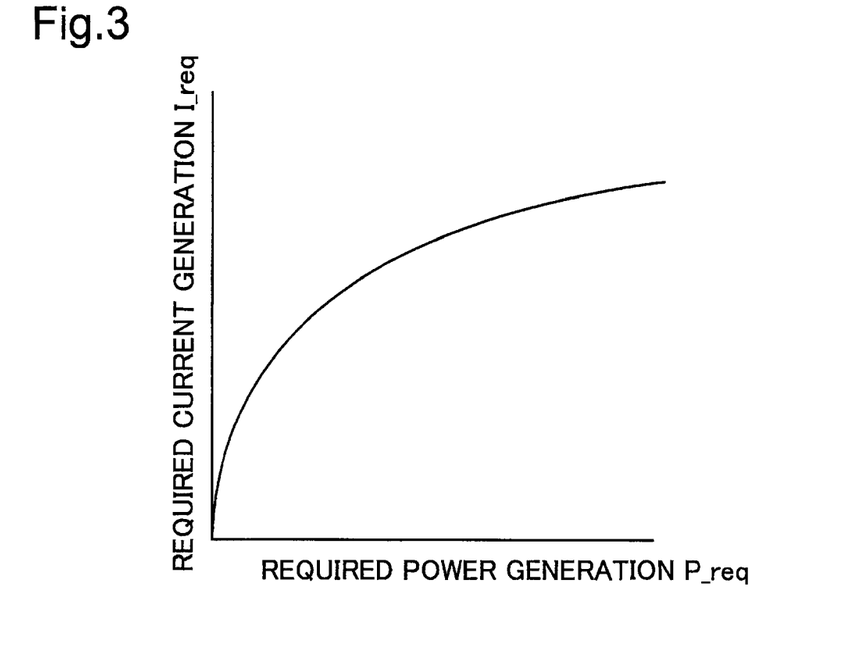
FIG. 3 shows a required power generation/required current generation conversion map.

FIG. 3 shows a "required power generation/required current generation conversion map" that describes a relationship between required power generation and required current generation. In the process of FIG. 2, the control unit 50 first acquires the required power generation required of the fuel cell 100 (Step S100). Then, by looking up in the required power generation/required current generation conversion map depicted in FIG. 3, the required current generation I_req required of the fuel cell 100 is determined on the basis of the required power generation P_req (Step S110). As shown in FIG. 3, the relationship of required current generation to required power generation in the required power generation/required current generation conversion map describes an upwardly convex curve. The required power generation/required current generation conversion map is stored in advance in the ROM of the control unit 50.

Figure 4:
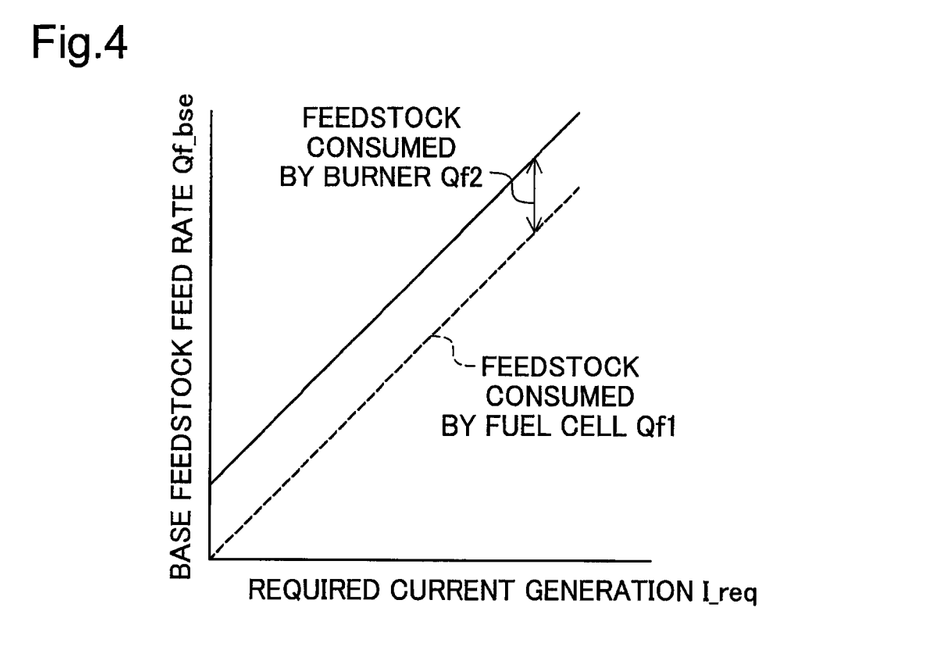
FIG. 4 shows a required current generation/base feedstock feed rate conversion map.

FIG. 4 shows a "required current generation/base feedstock feed rate conversion map" that describes a relationship between required current generation and a base feedstock feed rate. In the process of FIG. 2, the control unit 50 next looks up in the required current generation/base feedstock feed rate conversion map shown in FIG. 4, and on the basis of the required current generation Ireq decides a base feedstock feed rate Qf_bse (Step S120). This base feedstock feed rate Qf_bse represents the sum of "the feedstock quantity Qf1 needed for the reformer 20 to produce fuel gas in a quantity equivalent to that consumed by generation in the fuel cell 100 in order to obtain the required current generation I_req" and "the feedstock quantity Qf2 necessary for the reformer 20 to produce fuel gas in a quantity equivalent to that combusted by the burner 40 in order to maintain the reformer 20 temperature at that time". The required current generation/base feedstock feed rate conversion map is stored in advance in the ROM of the control unit 50.

Figure 5:
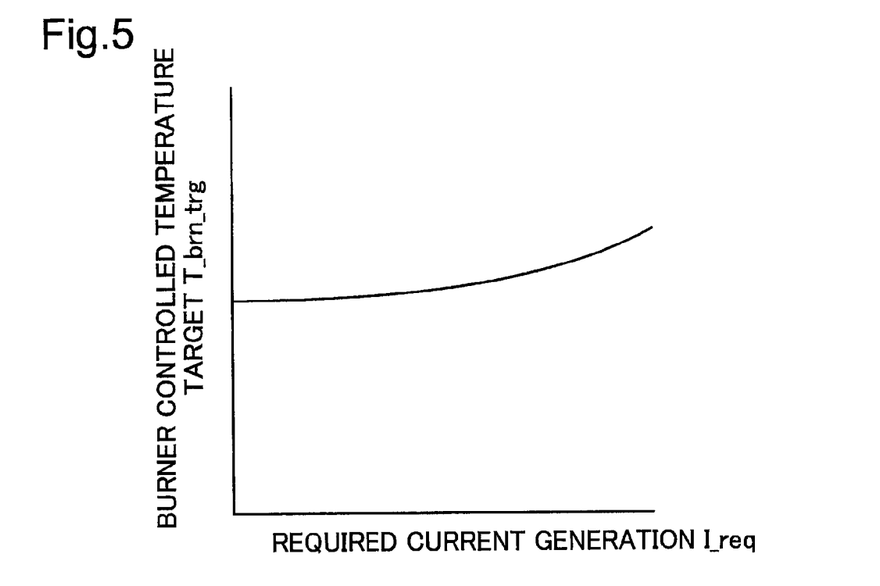
FIG. 5 shows a required current generation/burner controlled temperature target conversion map.

FIG. 5 shows a "required current generation/burner controlled temperature target conversion map" that describes a relationship between required current generation and a burner controlled temperature target. In the process of FIG. 2, the control unit 50 next looks up in the required current generation/burner controlled temperature target conversion map shown in FIG. 5, and on the basis of the required current generation I_req decides a controlled temperature target T_brn_trg for the burner 40 (Step S130). The controlled temperature target T_brn_trg of the burner 40 represents the burner 40 temperature that is optimal for reforming the feedstock, when the reformer 20 produces fuel gas in a quantity equivalent to that consumed by the fuel cell 100 and by the burner 40 in order to obtain the required current generation I_req. The required current generation/burner controlled temperature target conversion map is stored in advance in the ROM of the control unit 50.

Figure 6:
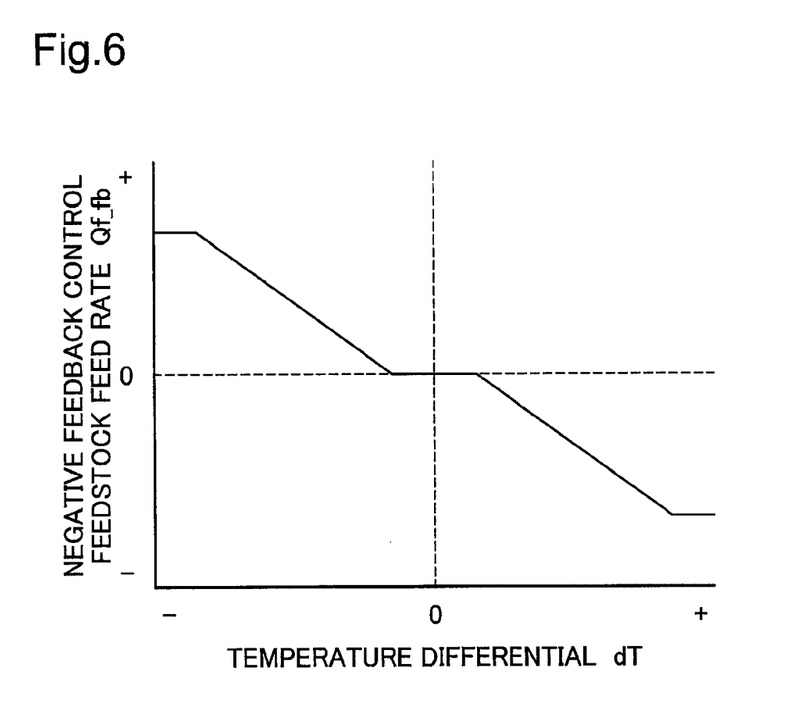
FIG. 6 shows a temperature differential/negative feedback control feedstock feed rate conversion map.

FIG. 6 shows a "temperature differential/negative feedback control feedstock feed rate conversion map" that describes a relationship between a temperature differential and a negative feedback control feedstock feed rate. In the process of FIG. 2, the control unit 50 next senses the temperature T_brn of the burner 40 through the temperature sensor 41 (Step S140). The control unit 50 then calculates a temperature differential dT(={sensed temperature T_brn}−{burner controlled temperature target T_brn_trg}) (Step S150). Then, by looking up in the temperature differential/negative feedback control feedstock feed rate conversion map shown in FIG. 6, the control unit 50 determines a negative feedback control feedstock feed rate Qf_fb on the basis of the temperature differential dT (Step S160). The negative feedback control feedstock feed rate Qf_fb represents a correction dependent on the temperature of the burner 40, for the quantity of feedstock to be delivered to the reformer 20.

If the temperature T_brn of the burner 40 is higher than the burner controlled temperature target T_brn_trg (dT>0), a correction quantity of zero or a negative number is established in order to reduce the amount of hydrogen supplied to the burner 40 and maintain the temperature T_brn of the burner 40 within a prescribed temperature range that includes the burner controlled temperature target T_brn_trg (see right in FIG. 6). If the temperature T_brn of the burner 40 is lower than the burner controlled temperature target T_brn_trg (dT<0), a correction quantity of zero or a positive number is established in order to increase the amount of hydrogen supplied to the burner 40 and maintain the temperature T_brn of the burner 40 within a prescribed temperature range that includes the burner controlled temperature target T_brn_trg (see left in FIG. 6). The temperature differential/negative feedback control feedstock feed rate conversion map is stored in advance in the ROM of the control unit 50.

In the process of FIG. 2, the control unit 50 next adds up the base feedstock feed rate Qf_bse and the negative feedback control feedstock feed rate Qf_fb to determine a final feedstock feed rate Qf_fin (Step S170). On the basis of this value, the control unit 50 then controls the pressurizing pump 10 and other elements of the feedstock supplying section (Step S180). The control unit 50 subsequently repeats the process of Steps S100 to S180 described above.

According to the fuel cell system 1000 of the first embodiment described above, control of the pressurizing pump 10 and other elements of the feedstock supplying section, that is, control of the feed rate of feedstock to the reformer 20, is carried out on the basis of the temperature of the burner 40 (see FIG. 6). Thus, no complicated control scheme is needed, and the consistency and convergence of control can be improved through a relatively simple feature. Moreover, the temperature of the reformer 20 is maintained within a prescribed temperature range optimized for reforming the feedstock, and a prescribed quantity of fuel gas is generated by the reformer 20 as a result. Thus, generation efficiency in the fuel cell 100 may be improved. That is, according to the fuel cell system 1000 of the present embodiment, generation efficiency in the fuel cell 100 may be improved.

Figure 7:
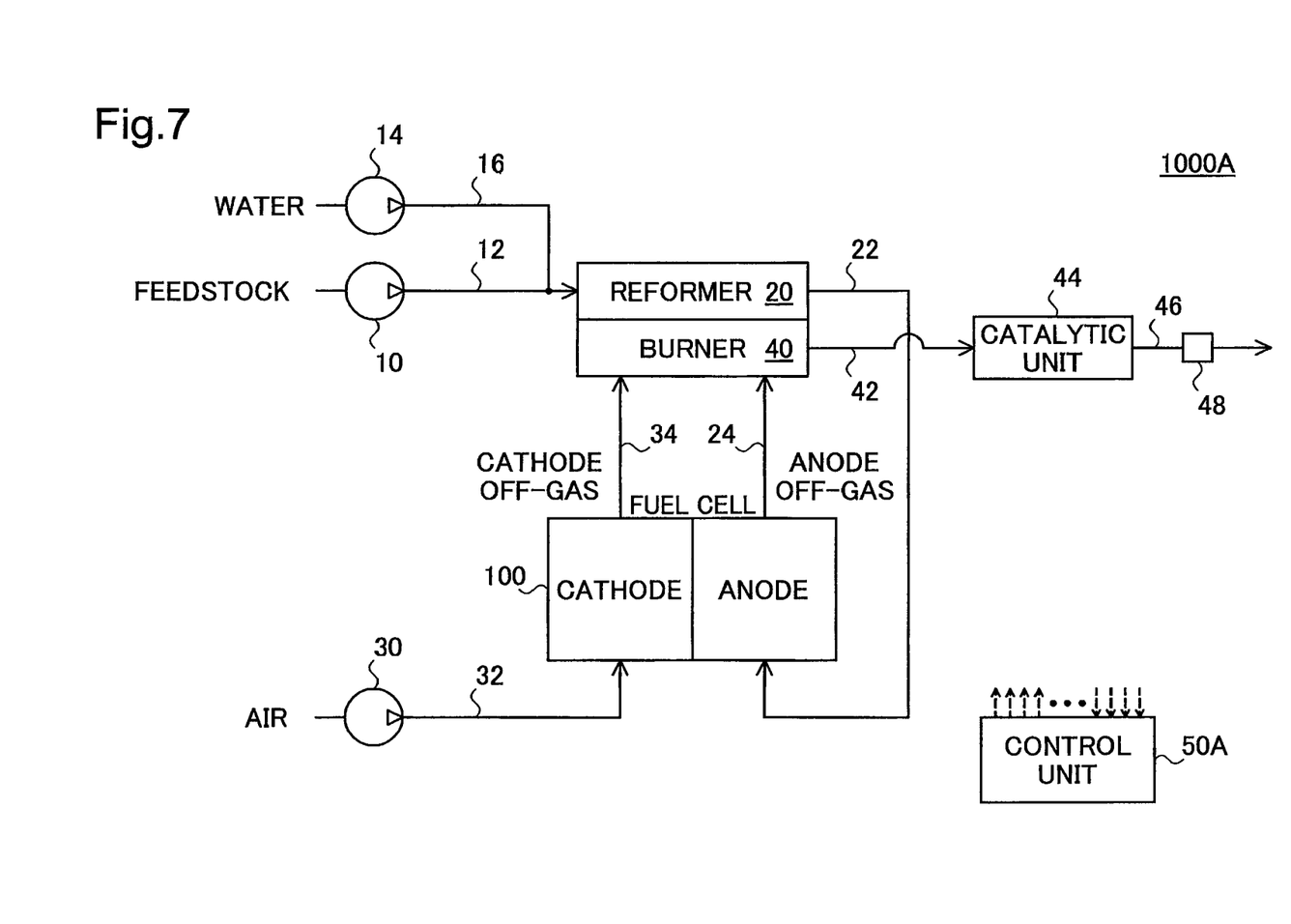
FIG. 7 depicts the general features of a fuel cell system 1000A according to a second embodiment of the invention.

B. Second Embodiment:

B1. Fuel Cell System:

FIG. 7 depicts the general features of a fuel cell system 1000A according to a second embodiment of the invention. The features of the fuel cell system 1000A of the second embodiment are identical to the features of the fuel cell system 1000 of the first embodiment, with the exception of the following. Specifically, the fuel cell system 1000A of the second embodiment lacks the temperature sensor 41 provided in the fuel cell system 1000 of the first embodiment. Instead of the temperature sensor 41, the fuel cell system 1000A of the second embodiment is provided on the line 46 with a carbon monoxide sensor 48 for detecting the concentration of carbon monoxide present in the effluent gases.

Also, the specifics of operational control carried out by the control unit 50A in the fuel cell system 1000A of the second embodiment differ from the specifics of operational control carried out by the control unit 50 in the first embodiment.

Figure 8:
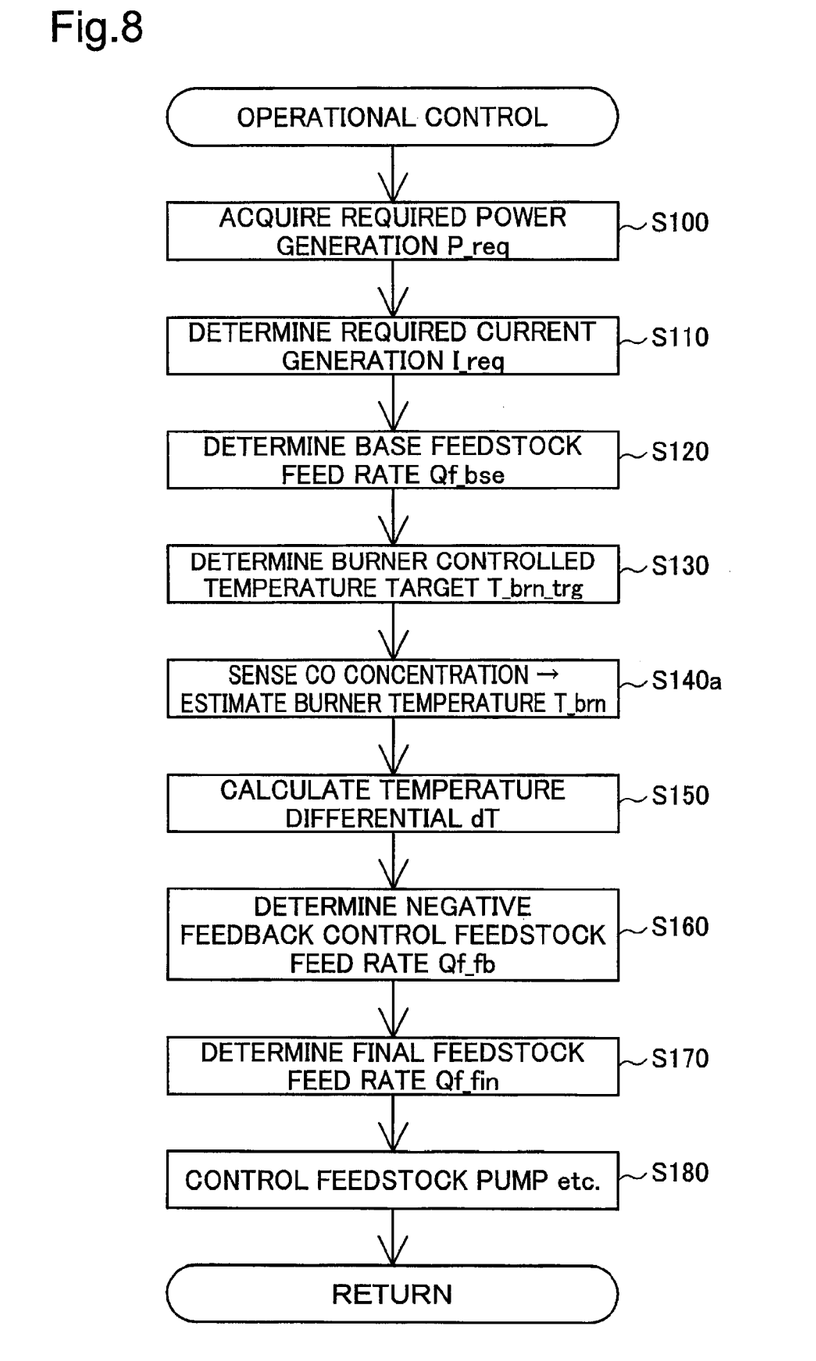
FIG. 8 is a flowchart showing the flow of operational control in the fuel cell system 1000A according to the second embodiment.

B2. Operational Control:

FIG. 8 is a flowchart showing the flow of operational control in the fuel cell system 1000A according to the second embodiment. This control process is one that the control unit 50A executes repeatedly at prescribed intervals during electricity generation by the fuel cell 100. In the present embodiment as well, the control unit 50A executes this process at 1024-ms intervals.

As will be appreciated from a comparison of FIG. 8 and FIG. 2, the processes of Steps S100 to S130 and of Steps S150 to S180 during operational control of the fuel cell system 1000A of the second embodiment are the same as those of operational control of the fuel cell system 1000 of the first embodiment. However, during operational control of the fuel cell system 1000A of the second embodiment, the control unit 50A carries out the process of Step S140a in place of Step S140 in operational control of the fuel cell system 1000 of the first embodiment.

Figure 9:
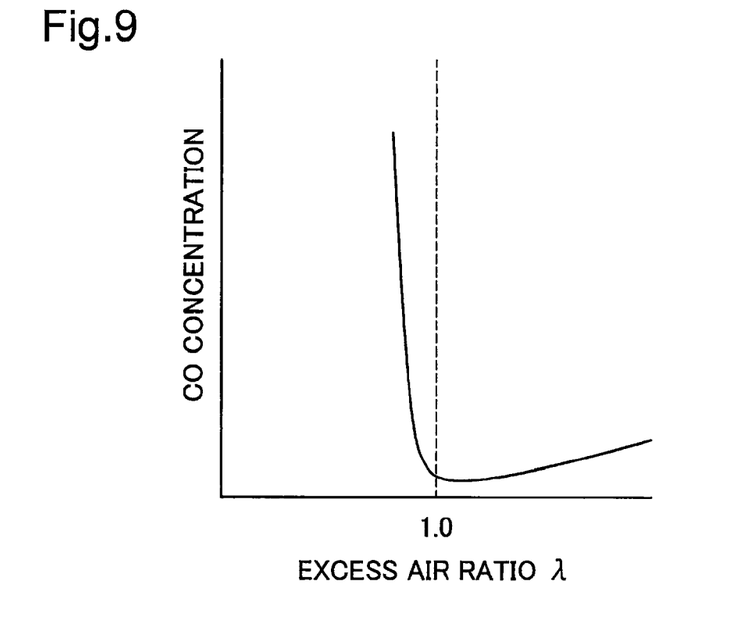
FIG. 9 shows the relationship between concentration of carbon monoxide contained in effluent gases and excess air ratio $\lambda$.
Figure 10:
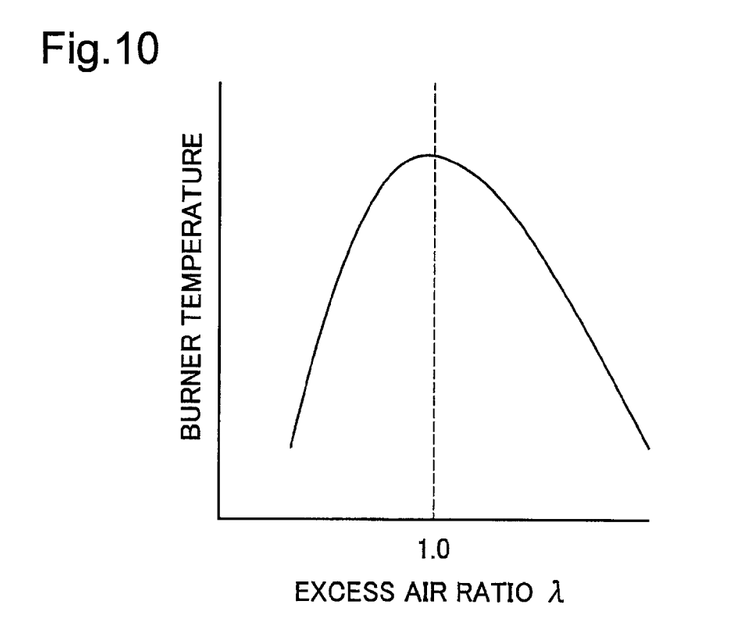
FIG. 10 shows the relationship between excess air ratio $\lambda$, and temperature of a burner 40.

FIG. 9 shows the relationship between concentration of carbon monoxide contained in effluent gases and the excess air ratio λ. FIG. 10 shows the relationship between excess air ratio λ and temperature of the burner 40. Subsequent to Step S130, in Step S140a the control unit 50A uses the carbon monoxide sensor 48 to sense the concentration of carbon monoxide contained in the effluent gases. On the basis of this sensor value, the control unit 50A then estimates the temperature T_brn of the burner 40 (Step S140a). As shown in FIG. 9, the relationship between the concentration of carbon monoxide contained in effluent gases and the excess air ratio X is known. Also, as shown in FIG. 10, the relationship between the excess air ratio X and the temperature of the burner 40 is known. Thus, in Step S140a, by utilizing the relationships depicted in FIGS. 9 and 10 it is possible to readily estimate the temperature T_brn of the burner 40 on the basis of the concentration of carbon monoxide contained in the effluent gases.

As will be appreciated from FIG. 9, where the concentration of carbon monoxide lies within a relatively small prescribed range, the excess air ratio X may assume two values (see the lower part of FIG. 9). If the carbon monoxide concentration sensed by the carbon monoxide sensor 48 lies within this range, the control unit 50A selects from among the two possible values the value having the higher probability of being correct, on the basis of the value of excess air ratio λ up to that point, or the temperature of the burner 40 for example.

Like the fuel cell system 1000 according to the first embodiment, the fuel cell system 1000A according to the second embodiment affords improved generation efficiency in the fuel cell 100 through a relatively simple feature.

Moreover, the fuel cell system 1000A according to the second embodiment is equipped with a carbon monoxide sensor 48. Thus, as described previously, it is possible to estimate the temperature T_brn of the burner 40 (see FIG. 10), as well as to monitor carbon monoxide emissions from the fuel cell system 1000A, which is desirable from the standpoint of preventing environmental pollution.

C. Modification Examples:

While the invention has been described herein in terms of a number of preferred embodiments, it is to be understood that there is no intention to limit the invention to the embodiments herein, and that various alternative modes are possible within the spirit and scope of the invention. Possible modifications include the following for example.

C1. Modification Example 1:

In the preceding first embodiment, the temperature sensor 41 senses the temperature T_brn of the burner 40 (see Step S140 of FIG. 2), and the feed rate Qf_fin of feedstock to the reformer 20 is determined on the basis of the temperature T_brn of the burner 40 (see ibid. S150 to S170). However, the invention is not limited to this arrangement. In an alternative arrangement, a temperature sensor senses the temperature of the reformer 20, and the feed rate Qf_fin of feedstock to the reformer 20 is determined on the basis of the temperature of the reformer 20.

C2. Modification Example 2:

In the preceding second embodiment, the carbon monoxide concentration present in effluent gases is sensed by the carbon monoxide sensor 48, and the temperature T_brn of the burner 40 is estimated on the basis of this concentration (see S140a of FIG. 8). However, the invention is not limited to this arrangement. In an alternative arrangement for example, the concentration of oxygen or nitrogen oxides present in the effluent gases is sensed, and the temperature T_brn of the burner 40 is estimated on the basis of this concentration.

C3. Modification Example 3:

In the preceding second embodiment, the temperature T_brn of the burner 40 is estimated on the basis of the concentration of carbon monoxide present in the effluent gases (see S140a of FIG. 8). However, the invention is not limited to this arrangement. In an alternative arrangement for example, the temperature T_brn of the burner 40 is estimated on the basis of the mass of carbon monoxide, oxygen, or nitrogen oxides present in the effluent gases. The mass of carbon monoxide, oxygen, or nitrogen oxides may be sensed by various methods. Alternatively, rather than mass, the temperature T_brn of the burner 40 may be estimated on the basis of some other objectively measurable quantity.

C4. Modification Example 4:

According the fuel cell system 1000A of the preceding second embodiment, the carbon monoxide sensor 48 is situated downstream from the catalytic unit 44, specifically, in the line 46 (see FIG. 7). However, the invention is not limited to this arrangement. The carbon monoxide sensor 48 may be situated immediately downstream from the burner 40, or in the line 42 between the burner 40 and the catalytic unit 44. According to the fuel cell system 1000A, the temperature of the burner 40 is estimated on the basis of carbon monoxide concentration subsequent to reduction by the catalytic unit 44. Thus, if for example the performance of the catalytic unit 44 should become impaired, it may no longer be possible to accurately estimate the temperature of the burner 40. However, by sensing the carbon monoxide concentration upstream from the catalytic unit 44 using a carbon monoxide sensor situated upstream from the catalytic unit 44, it is possible to more reliably estimate the temperature of the burner 40 in a manner unaffected by any deterioration in performance of the catalytic unit 44. However, in this case it is desirable to provide a carbon monoxide sensor downstream from the catalytic unit 44 as well, in order to monitor deterioration in performance and carbon monoxide emissions of the catalytic unit 44.

C5. Modification Example 5:

According to the preceding embodiments, during operational control of the fuel cell system 1000, 1000A, reference is made to the required power generation/required current generation map (FIG. 3), the required current generation/ base feedstock feed rate conversion map (FIG. 4), the required current generation/burner controlled temperature target conversion map (FIG. 5), and the temperature differential/negative feedback control feedstock feed rate conversion map (FIG. 6). However, the invention is not limited to this arrangement. The process of converting between various quantities may instead be carried out through computational operations for example. Moreover, the required power generation/required current generation map (FIG. 3), the required current generation/base feedstock feed rate conversion map (FIG. 4), the required current generation/ burner controlled temperature target conversion map (FIG. 5), and the temperature differential/negative feedback control feedstock feed rate conversion map (FIG. 6) may respectively take different forms from those shown in FIGS. 3 to 6. For example, the relationship of required current generation to required power generation in the required power generation/required current generation map may take the form of a downwardly convex curve. That is, the required power generation/required current generation map, the required current generation/base feedstock feed rate conversion map, the required current generation/burner controlled temperature target conversion map, and the temperature differential/negative feedback control feedstock feed rate conversion map may respectively consist of any information for which a single output value can be determined for a single input value.

C6. Modification Example 6:

According to the preceding embodiments, during operational control of the fuel cell system 1000, 1000A, the final feedstock feed rate Qf_fin is determined through addition of the base feedstock feed rate Qf_bse and the negative feedback control feedstock feed rate Qf_fb (see S170 of FIG. 2 and FIG. 8). However, the invention is not limited to this arrangement. For example, the final feedstock feed rate Qf_fin may be determined by multiplying the base feedstock feed rate Qf_bse shown in FIG. 4 by a correction factor dependent on the temperature of the burner 40. Alternatively, the final feedstock feed rate Qf_fin may be determined from the sum of Qf1 shown in FIG. 4, and a value derived by multiplying Qf2 by a correction factor dependent on the temperature of the burner 40. Generally, according to the present invention, it is acceptable to control the feed rate of feedstock to be delivered to the reformer 20 so as to maintain the temperature of the reformer 20 within a temperature range optimized for reforming the feedstock.

C7. Modification Example 7:

Computer program products implementing the present invention may be reduced to practice in various embodiments. Embodiments such as the following are possible, for example.

(i) Computer-readable storage media, for example, flexible disks, optical disks, or semiconductor memory.

(ii) Computers including computer-readable storage media, for example, a magnetic disk or semiconductor memory.

(iii) Computers having computer programs temporarily stored in memory via data transfers.

While the invention has been described in detail herein with reference to its exemplary preferred embodiments, the invention is not limited to the particular embodiments or features set forth herein. Various modifications and equivalent features lie within the scope of the invention. While the various elements of the disclosed invention are disclosed in terms of various particular combinations and features, these are merely exemplary, and a greater or smaller number of elements may be included. Alternatively, a single element may be included. These arrangements likewise lie within the scope contemplated in the present invention.

The invention claimed is:

1. A fuel cell system comprising:
a reformer which reforms a feedstock to produce a reformed gas;
a feedstock supplying section which supplies the feedstock to the reformer;
a fuel cell which generates electricity using a fuel gas contained in the reformed gas;
a burner section which combusts fuel gas that was not consumed in electricity generation in the fuel cell to heat the reformer;
a carbon monoxide sensor being situated between the burner section and a catalytic unit that reduces a concentration of carbon monoxide contained in effluent gases discharged from the burner section; and
a control portion programmed to control a feed rate of the feedstock supplied from the feedstock supplying section to the reformer,
wherein the control portion is programmed to:
determine one temperature of the burner section based on a concentration or amount of a carbon monoxide contained in effluent gases discharged from the burner section sensed by the carbon monoxide sensor, and
maintain a temperature of the reformer within a prescribed temperature range appropriate for reforming the feedstock by controlling the feed rate of the feedstock based only on the determined one temperature.

* * * * *